US008909695B1

(12) United States Patent
Vendrow et al.

(10) Patent No.: US 8,909,695 B1
(45) Date of Patent: Dec. 9, 2014

(54) ACCESSING USER MESSAGES AT A HOSTED COMMUNICATIONS PROVIDER

(75) Inventors: Vlad Vendrow, Redwood Shores, CA (US); Vladimir Shmunis, South Lake Tahoe, CA (US)

(73) Assignee: RingCentral, Inc., San Mateo, CA (US)

( * ) Notice: Subject to any disclaimer, the term of this patent is extended or adjusted under 35 U.S.C. 154(b) by 499 days.

(21) Appl. No.: 13/084,519

(22) Filed: Apr. 11, 2011

Related U.S. Application Data

(60) Provisional application No. 61/322,659, filed on Apr. 9, 2010.

(51) Int. Cl.
G06F 15/16 (2006.01)

(52) U.S. Cl.
USPC .............. 709/203; 709/219; 379/52; 455/431

(58) Field of Classification Search
CPC .............. H04L 29/08072; H04L 29/06; H04L 29/0809; H04L 29/08288; H04L 69/24; H04L 69/40; H04L 12/18; H04L 12/58; H04L 12/585
USPC ...................... 709/203, 219; 379/52; 455/431
See application file for complete search history.

(56) References Cited

U.S. PATENT DOCUMENTS

| | | | |
|---|---|---|---|
| 2005/0080863 A1* | 4/2005 | Daniell ........................ | 709/206 |
| 2005/0124337 A9* | 6/2005 | Gresham et al. .............. | 455/431 |
| 2007/0116190 A1* | 5/2007 | Bangor et al. ................. | 379/52 |
| 2009/0150486 A1* | 6/2009 | Franco et al. ................. | 709/203 |
| 2011/0072114 A1* | 3/2011 | Hoffert et al. ................. | 709/219 |
| 2011/0179106 A1* | 7/2011 | Hulse et al. ................... | 709/203 |
| 2012/0173981 A1* | 7/2012 | Day ............................. | 715/719 |
| 2013/0167137 A1* | 6/2013 | Bansod et al. ................ | 717/175 |

OTHER PUBLICATIONS

J. Rosenberg et al., Request for Comments (RFC) 3261, entitled "SIP: Session Initiation Protocol", Jun. 2002, published by the Internet Engineering Task Force (IETF), 232 pages.
H. Schulzrinne et al., RFC 3550, entitled "RTP: A Transport Protocol for Real-Time Applications", Jul. 2003, published by the Internet Engineering Task Force (IETF), 98 pages.

* cited by examiner

Primary Examiner — Michael C Lai
(74) Attorney, Agent, or Firm — Fish & Richardson P.C.

(57) ABSTRACT

A hosted communications provider or network supports communications to multiple users, each having associated accounts. The network includes memory storage device(s) for storing communications message(s) directed to one or more of the users. A web server module is configured to receive access requests for the user accounts; such requests originating from a user device. The network provides the requested access and sends the information using a non HTML format for at least a portion of the information. The user device displays the requested information on a display device. In some implementations, the information is sent to the user in a non-HTML format. In some implementations, at least a portion of the user interface is provided in a file format which does not include HTML.

10 Claims, 11 Drawing Sheets

ACCESSING USER MESSAGES AT A HOSTED COMMUNICATIONS PROVIDER

CROSS-REFERENCE TO RELATED APPLICATIONS

This application claims the benefit of priority Under 35 U.S.C. §119(e) of U.S. Provisional Application Ser. No. 61/322,659, filed on Apr. 9, 2010. The disclosure of the prior application is considered part of and is incorporated by reference in the disclosure of this application.

BACKGROUND

Networks that provide hosted voice, messaging, and data services to users may be provided by a virtual private branch exchange (vPBX), which handles communications using a Voice over Internet Protocol (VoIP) service. To callers outside the network, the vPBX appears as a traditional PBX, enabling small businesses and organizations to provide a consistent, professional customer-facing interfacing. VoIP provides a method to deliver voice communications over the Internet rather than through circuit-switched networks. The communications may originate and terminate at VoIP devices, or a gateway may be used to route calls from the Internet to a Public-Switched Telephone Network (PSTN). Some of the services offered by these networks, or hosted communications providers, include the ability to process telephony calls, to transmit and receive voicemail, to transmit and receive text and data messages, and/or to transmit and receive fax messages. User access the hosted communications to take advantage of these services. As user device types and message formats increase, so too the complexity of the network increases.

DETAILED DESCRIPTION

Figure 1:
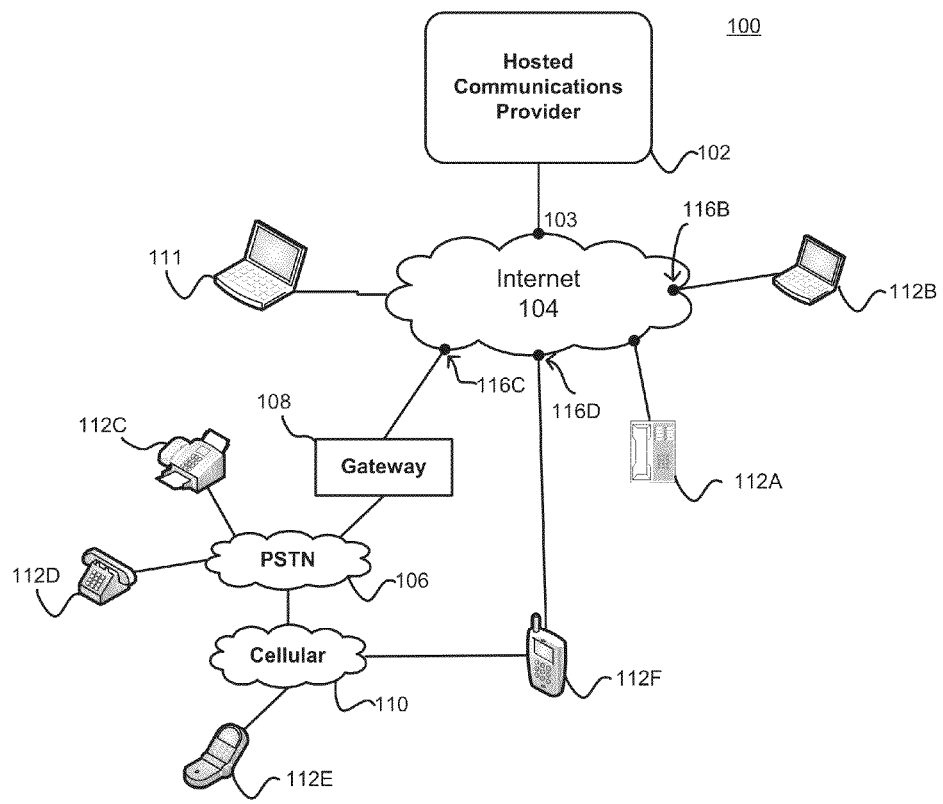
FIG. 1 shows an example of a high-level block diagram of a communications network.

A hosted Private Branch Exchange (PBX) system provides services through a network cloud which performs as a traditional PBX. The cloud includes a configuration of servers coupling the system users to a large area network, such as the Internet. A hosted PBX may provide unified communication systems and unified messaging systems integrate multiple services for a user, making communication and messaging more flexible to the activities and devices of the user. Unified Communications (UC) generally integrates real-time communication services, such as instant messaging (chat), with non-real-time communication services, such as e-mail. Unified Messaging (UM) generally integrates non-real time communications, such as Voice Mail (VM), e-mail, texting, Short Message Services (SMS), and fax. As users expand their mobility, variety of devices, and platforms, the complexity of UC and UM systems increases.

A hosted communications provider provides a variety of services to a variety of users. This matrix of operating devices, features and messaging introduces challenges and advantages. The challenges involve supporting a wide variety of services and enabling interoperability of devices. The advantages include the ability to deliver messages and content over a variety of channels, including different delivery and messaging formats, and a variety of routing strategies. For example, a mobile to landline communication may be routed from the mobile to a cellular network to the Internet to the network; and from network to the Internet to a PSTN to a landline phone. Similarly, the users may send text messages while engaging in a conference call and receiving voice mail messages.

The example of communication system 100 implements user partitioning. The communication system 100 can be, for example, a hosted private branch exchange (PBX) system, which may also be referred to as a vPBX, a cloud-based PBX, an internet telephony system, or an Internet Protocol (IP) PBX. Unlike a premise-based PBX, which requires PBX equipment to be physically located on or near the user premises where the PBX services are to be provided, a hosted PBX can provide PBX communication services over the Internet, including services such as, without limitation, Voice over Internet (VoI), Voice over IP (VoIP), facsimile over IP (FoIP), call forwarding, voicemail, web-based online account management, and other similar PBX functions. The communication system 100 may include data centers (not shown), wherein each data center may be a point of presence having one or more servers, routers, switches, and/or network connections necessary to support the communication system 100. Each data center may be located in a same or different geographical location or region.

Unified communication systems and unified messaging systems integrate multiple services for a user, making communication and messaging more flexible to the activities and devices of the user. Unified Communications (UC) generally integrates real-time communication services, such as instant messaging (chat), with non-real-time communication services, such as e-mail. Unified Messaging (UM) generally integrates non-real time communications, such as Voice Mail (VM), e-mail, texting, Short Message Services (SMS), and fax. As users expand their mobility, variety of devices, and platforms, the complexity of UC and UM systems increases.

In some implementations, a communication system for processing user accounts in a hosted PBX system can include vPBX system. Such systems may provide UC and UM systems that enable users to send a message in one medium and receive communications on another medium, including when the message and communications are part of a communication string. The example of communication system implements user partitioning. The communication system may be, for example, a hosted PBX system, a cloud-based PBX, an internet telephony system, or an Internet Protocol (IP) PBX. Unlike a premise-based PBX, which requires PBX equipment to be physically located on or near the user premises where the PBX services are to be provided, a hosted PBX can provide PBX communication services over the Internet, including services such as, without limitation, Voice over Internet (VoI), Voice over IP (VoIP), facsimile over IP (FoIP), call forwarding, voicemail, web-based online account management, and other similar PBX functions. The communication system may include data centers (not shown), wherein each data center may be a point of presence having one or more servers, routers, switches, and/or network connections necessary to support the communication system. Each data center may be located in a same or different geographical location or region.

In some implementations, a communication system for processing user accounts in a hosted PBX system provides UC and UM systems that enable users to send a message in one medium and receive communications on another medium, including when the message and communications are part of a communication string. In one example a unified messaging system integrates several different communications media to allow a user to send and retrieve voice, fax, data, and other messages (e.g., e-mail, text, SMS) from a single interface, while allowing access to a variety of devices, such as a telephone Land Line (LL), a fax device, a cellular telephone, a Personal Computer (PC), other types of wireless devices, and so forth. The interface is a network, which processes communications with multiple devices. Some of the devices support multiple messaging protocols, such as plain text, HTML, and others. A hosted network or communication provider, such as a vPBX, may support some or all of these formats.

For example, messages may be sent in a plain text format. A plain text message is a widely accepted form of messaging; e-mail message readers are generally able to display text messages in plain text format. A cross-platform messaging format allows document interchange between systems, which allows portability of files. One type of cross-platform messaging format is the Rich Text Format (RTF). Another format is the HTML format which allows display of rich content in a message. Using an HTML mail format, the message is sent as an HTML page, including tags to change the appearance of the text. The recipient's e-mail client program then formats and displays the HTML.

It is possible to merge and/or combine multiple formats, such as to mix plain text with HTML. In this way, a network is able to send messages to external domains as plain text and as HTML.

The Multipurpose Internet Mail Extensions (MIME) is an Internet standard that extends the format of e-mail to support non-text attachments, multiple part message bodies, American Standard Code for Information Interchange (ASCII) and non ASCII text and header information. User-written Internet e-mail, as well as automated e-mail, is often transmitted via Simple Mail Transfer Protocol (SMTP) in MIME format. Internet e-mail may be referred to as SMTP/MIME e-mail. The content types defined by MIME standards are applicable to a variety of communication protocols, such as Hypertext Transfer Protocol (HTTP) for the World Wide Web (WWW). HTTP specifies that data be transmitted in the context of e-mail-like messages, although the data most often is not actually e-mail.

The user-to-user encoding (uuencode) is a form of binary-to-text encoding, which is used to convert data to fairly common characters which will be understood by multiple systems. The program uudecode reverses the effect of uuencode, recreating the original binary file exactly. These formats, uuencode/decode, became popular for sending binary files by e-mail and posting to news groups. MIME may be combined with a uuencode which 20 merges two different methods of sending binary attachments with messages.

The proliferation of wireless devices has added to the messaging formats available. Short Message Service (SMS) is a simple, common type of text message supported by a large number of mobile phones. Proprietary messaging, such as "Smart Messaging" by Nokia, allow users to create messages with a variety of features. For example, such messaging may allow pictures, ring tones, virtual business cards or other types of non-text data, all within a message that is often compatible with the SMS text standard. In other words, although these messages may contain non-text content, they still use SMS text data stream to communicate the data.

The Multimedia Messaging Service (MMS) format also allows a user to create messages with text, picture, music and other content. MMS messages may consist of multiple pages, each page with its own text, picture, music, and so forth. MMS is currently employed by many mobile phones.

A network may support a variety of messaging formats, and may further support a variety of services and applications for users. Such a unified messaging system includes a network, which may be implemented as one or more servers, including a data memory to store messages, which may include messages of different types and of different communications media (e.g., received messages, sent messages, voicemail messages, fax messages, etc.). Messages may be grouped into message clusters, or mailboxes, associated with one or more individual user, or groups of users. In some embodiments, an individual message includes, but is not limited to, a unique message index (e.g. identifiers), message content (e.g., voice, video, data), message properties (e.g., date and time, sender information), and message status (e.g., read, unread). A particular combination of message indexes and message statuses of the messages in a given message cluster is referred to as the state of the messages in the given cluster.

The system may further include a variety of devices for communication, each of the devices associated with or accessible by users. In some implementations, the wireless devices support a Wireless Local Area Network (WLAN) over the air protocol, such as those supporting Wi-Fi or Bluetooth communications. The wireless devices may further support multiple wireless protocols.

A system may implement call processing techniques and methods which provide call routing to multiple of the devices. For example in one scenario, a voice call to a user is processed by a default path first, such as to a particular device, and then may be routed to another device according to routing rules. Such routing rules may direct the call to a LL telephone first, and then to a cellular telephone.

A user in such a hosted system, or hosted communications provider, has an associated account which is accessed through the system. In one example, the network receives a communications message directed to a user of the hosted communications provider. The system stores the communications message in a local storage device, such as a memory storage device or dedicated memory storage unit. As the system is configured to process digital communications according to and Internet Protocol (IP), the system is able to process web requests and has a web server module. A web server module receives an access request from a user; the access request is to access the user's account and is sent by the user through a web browser module installed on a client device. The client device supports web interactions and displays a user interface allowing the user to request access to the account and to view the information information associated with the user account, which information is provided by the web server module of the system. In the present example, the system responds to the access request by sending information to the user's client device, wherein at least a portion of the user interface information is provided in a file format which does not include hypertext markup language (HTML) formatted data. The file format is intended for use by a display module working with the web browser module installed on the client device. The display module may be any of a variety of devices.

Users may access their stored messages from the hosted communications providers in several ways. For example, users can access their messages by retrieving them over a phone (mobile or landline), by receiving messages in email attachments, by receiving them over a fax machine, or by using a web browser. When a web browser is used by a user to access messages, the user typically uses a web browser installed on a local computer (the client) to connect to a web server belonging to the hosted communications provider, and view the messages that have been stored in the user's account. The user may also have the option to download the messages from the web server to the local computer. Typically, the user provides a password to log in to a webpage that displays information specific to the user's account, which includes, but is not limited to: the messages available for viewing or retrieval, information associated with the messages such as the time the message was received or the sender's identification information, account settings and preferences, etc.

There are many different web browsers that a user can use to log in to an online account. When a user logs in to the user's account, the hosted communication provider's web server typically serves up a user interface for the user that is formatted using hypertext markup language (HTML). However, a user interface transmitted in html can look different, depending on which web browser is used to view the user interface. This causes the user to have a different experience when logging in using one browser than with another, even though the user's account settings and preferences may stay the same. HTML is also not as well-suited for displaying multimedia files or interactive webpages. It would be desirable to provide a user with a uniform experience when viewing the user's account online, regardless of which web browser is used.

FIG. 1 is an example of a block diagram of a communications network 100. The communications network 100 includes a hosted communications provider 102, a packet-switched network (such as the Internet) 104, a PSTN 106, a PSTN-VoIP gateway 108, a cellular network 110, a client computer 111, and communication devices 112A-112F. The communication devices 112 include a VoIP phone 112A, a computer 112B configured to run communications software applications (e.g. VoIP, voice, audio, video, facsimile, or data applications), a fax machine 112C, a telephone 112D, a cellular phone 112E, and a multi-mode phone 112F. It should be noted that although client computer 111 and computer 112B are shown in FIG. 1 as notebook computers, they are not limited to being notebook computers; any computing device such as a desktop computer, computing tablet, computing personal accessory, etc. can be considered to be a computer 112B for the purposes of the description herein.

The hosted communications provider 102 is connected to the Internet 104. Transmissions to and from the hosted communications provider 102 between the Internet 104 and the PSTN 106 pass through the PSTN-VoIP gateway 108. The PSTN 106 is also in communication with the cellular network 110.

The hosted communications provider 102 provides messaging services to its users via its connection 103 to the Internet 104. A user of the hosted communications provider 102 can initiate or receive communications from any of the communication devices 112A-112F shown in FIG. 1. The VoIP phone 112A and the computer 112B can communicate using internet protocols; they communicate with the hosted communications provider 102 through the Internet 104. The fax machine 112C and the telephone 112D are connected to the PSTN 106; their communications with the hosted communications provider 102 pass through the PSTN-VoIP gateway 108. The PSTN-VoIP gateway 108 converts packets it receives from the Internet 104 into a format compatible for transmission across the PSTN 106, such as time-division multiplexing (TDM). The PSTN-VoIP gateway 108 also converts signals received from the PSTN 106 into IP packets for transmission over the Internet 104.

The cellular phone 112E is connected to the cellular network 110; it communicates with the hosted communications provider 102 via the cellular network 110 to the PSTN 106 to the PSTN-VoIP gateway 108. The multi-mode phone 112F can communicate with the hosted communications provider 102 via either the cellular network 110 or through its own connection to the Internet 104. The number and types of communication devices 112 shown in FIG. 1 are not exhaustive, and other configurations are possible. For example, a traditional analog telephone can be connected to the Internet 104 (e.g., in place of the PSTN 106) by using an Analog Telephone Adapter (ATA).

The hosted communications provider 102 provides VoIP and other media services through its Internet connection. There are various protocols used to send real-time multimedia (including voice and video communications) over the Internet 104. Session Initiation Protocol (SIP) is one protocol used to establish, transfer, and end sessions between communication devices and the hosted communications provider 102 across the Internet 104. The SIP signaling protocol is described further in Request For Comments (RFC) 3261, entitled "SIP: Session Initiation Protocol," by J. Rosenberg et al., June 2002, published by the Internet Engineering Task Force (IETF). Real-time Transport Protocol (RTP) is another protocol used to transport multimedia data packets across the Internet. The RTP protocol is described further in RFC 3550, entitled "RTP: A Transport Protocol for Real-Time Applications," by H. Schulzrinne et al., July 2003, published by the IETF. SIP and RTP are used herein as examples of protocols for illustrative purposes only, but there are many other protocols that can be used in IP telephony including, but not limited to: the protocols defined by the International Telecommunication Union Telecommunication Standardization Sector (ITU-T) H.323 standard, and proprietary protocols such as those used by Skype® VoIP Services, of Silver Lake Partners.

A caller can use any of the communication devices 112 shown in FIG. 1 to leave a voice, fax, or text message with a user of the hosted communications provider 102. For example, a caller can use the VoIP phone 112A to leave a voicemail message for the user. (The caller may or may not be another user of the hosted communications provider 102). The caller initiates the call from the VoIP phone 112A, dialing a number associated with the user. The call is received by the hosted communications provider 102, which recognizes that the number belongs to one of its users. The caller leaves a voice message, which is received and stored by the hosted communications provider 102 for later access by the user. Similarly, a caller can use the fax 112C to send a fax message to the user, or cellular phone 112E to send a text message to the user. The voice, fax, or text message can all be received and stored by the hosted communications provider 102.

The message can reach the user in various ways. For example, the hosted communications provider 102 can email the message to the user as soon as it is received by attaching the message to the email, e.g. as an audio file in the case of voicemail, or as an image file in the case of a facsimile. The user can also use a local client computer 111 to login to the user's account at the hosted communications provider 102 to check for the availability of any messages, and to download messages as desired to the user's local client computer. This latter method is discussed in further detail below.

Figure 2:
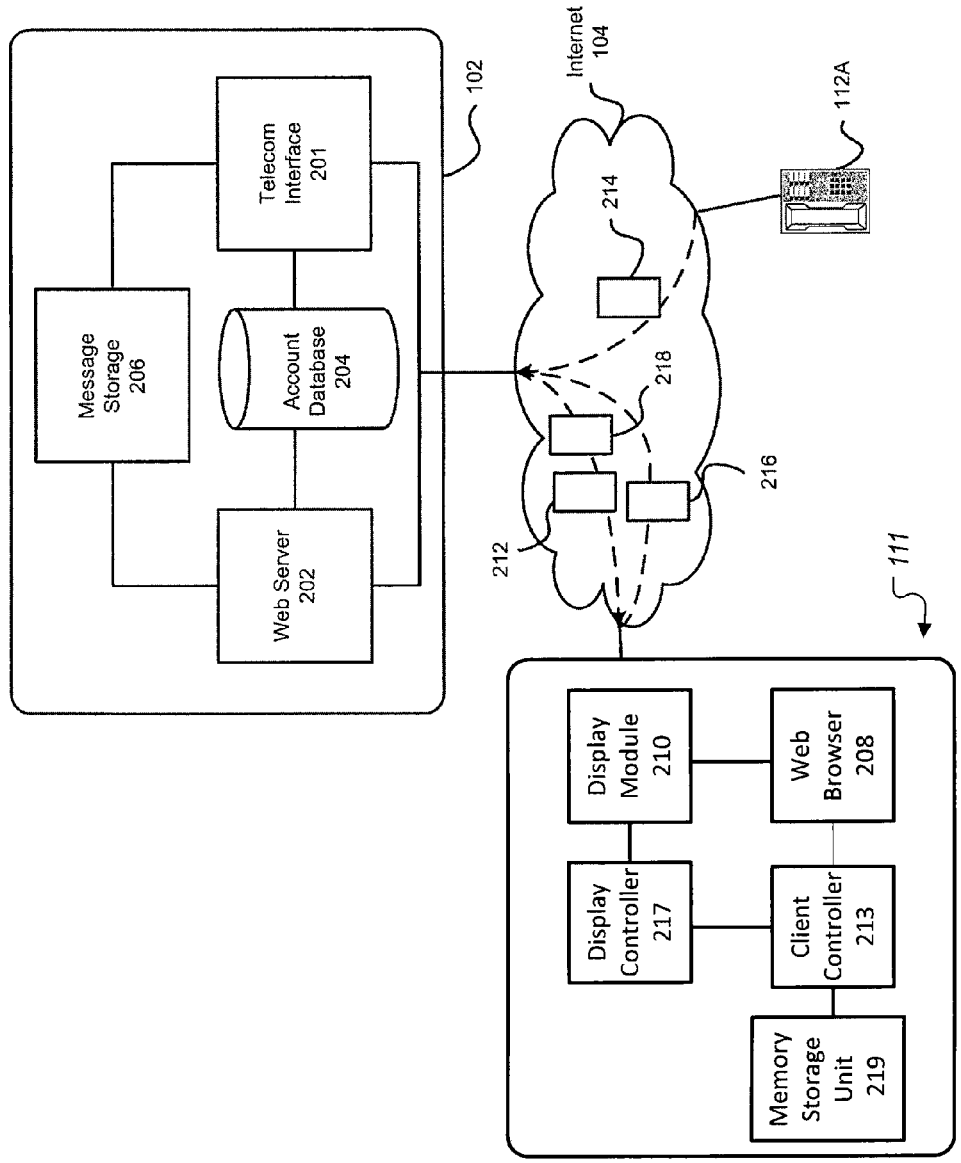
FIG. 2 shows an example of an expanded block diagram view of a client computer and a hosted communications provider as in FIG. 1.

FIG. 2 illustrates an expanded block diagram view of the client computer 111 and the hosted communications provider 102 from FIG. 1. The hosted communications provider 102 includes telecom interface module 201, web server 202, account database 204, and message storage device 206. The client computer 111 includes a web browser module 208, a display module 210 that works with the web browser module 208, and a display controller 217. The client computer 111 includes a client controller 213 which performs operations and implements computer-readable instructions stored in a memory storage unit 219.

As shown in FIG. 2, the client computer 111, the hosted communications provider 102, and the VoIP phone 112A are connected to the Internet 104. As described in the previous example, a caller can leave a message 214 for the user by calling the user's number. The call is received by the telecom interface module 201 in the hosted communications provider 102. The telecom interface module 201 verifies with the account database 204 that the number being called is associated with a valid account. After verification, the message 214 is stored in message storage device 206. As previously mentioned, the message 214 can include various formats such as voice, facsimile, text, or data. For example, a caller can use the fax machine 112C to send a fax message to the user, or cellular phone 112E to send a text message to the user. Regardless of whether the message is voice, fax, text, or data, the message 214 is received and stored in message storage device 206 by the hosted communications provider 102. As illustrated, the hosted communications provider 102 includes a controller 203 which acts to implement actions and respond to computer-readable instructions stored in the account database 204, web server 202, telecom interface 201, memory storage 206 and other modules (not shown).

Once the message 214 is stored, the user can use a local client computer 111 to log in to the user's account online to check for the availability of any messages, and to download messages as desired to the user's local client computer 111. The local client computer 111 has a web browser module 208 installed for browsing the Internet 104. The web browser module 208 displays an application window on a monitor, screen or other output display device (not shown) for the local client computer 111. To access the user's account online, the user enters an address (such as a Uniform Resource Locator, or "URL") to the web browser module 208 that points to the hosted communications provider's web server 202.

The first webpage returned by the web server 202 is typically a login page where the user provides a user name and a password to authenticate the user. The web server 202 checks that the user name and password belong to a valid account in the account database 204. Once the user is verified, the web server 202 sends a user interface 212 to the client computer 111. The user interface 212 displays account-specific information to the user, such as a list of the messages stored for the user, the account settings and preferences, and so forth. The user interface 212 is provided in a file format specific to the display module 210. The user interface 212 is interpreted by the display module 210. The display module 210 interprets the user interface 212 and displays it through the web browser module 208. Display module 210 is not a general HTML interpreter, and the user interface 212 is not in HTML. The file format of the user interface 212 is compatible with the display module 210, but is generally not compatible with the web browser module 208 as a stand-alone application without the display module 210.

Display module 210 works with the web browser module 208, but may or may not be included in the same application as the web browser module 208. For example, it can often be installed or downloaded as a separate component. Display module 210 is sometimes referred to as a "plug-in" to the web browser module 208 that extends the capabilities of the web browser module 208.

The display module 210 can be, for example, a version of the Adobe Flash Player® software, which is a cross-platform browser-based application runtime that enables viewing of expressive applications, content, and videos across screens and browsers. If the display module 210 is an Adobe Flash Player® software, then the user interface 212 would be a file compatible with Adobe Flash Player® software, such as a file in the shockwave flash, referred to as swf, file format. The format of the user interface 212 provided by the web server 202 should be compatible with the display module 210 installed on the client computer 111. Other display modules and compatible file formats for the user interface may also be used.

In some implementations, the display module 210 is a proprietary module developed by the hosted communications provider 102 and provided to its users. In some implementations, the user interface 212 is also provided in a proprietary format to be used by the display module 210. By developing its own proprietary display module 210 and user interface file format, the hosted communications provider 102 retains greater control over the appearance and functionality of the user interface 212. When the user interface 212 is designed and provided in a file format specifically intended for display module 210, more control may be retained over the appearance of the user interface 212, especially across various types of web browsers. In some implementations, the display module 210 is configured for a specified operation and the user interface 212 is configured thereto.

In some implementations, the user interface 212 is provided in two formats: an HTML format for the standard browser, and a format specific to the display module. The HTML portion of the user interface 212 is provided to maintain a basic level of compatibility with browsers without a display module 210 installed, but the display module format is the primary way of providing account information to the user, and the primary way for the user to configure, personalize, and access the user's account.

The user interface 212 provides access to messages for the user stored in the message storage device 206. This access can be in the form of links to the messages, or other display items that can be selected by the user. When a user selects a message link in the user interface 212, the display module 210 sends a request 216 back to the web server 202 for the message.

The web server 202 receives the request 216 and retrieves the requested message 218 from the message storage device 206. The web server 202 then returns the requested message 218 to the user. In some implementations, the requested message 218 can be displayed or played back directly by the display module 210 in the web browser module 208. In some implementations, the requested message 218 is downloaded to the local client computer 111 for play back or display through a separate application A user accesses messages stored in the network 102 by interfacing with the web browser module and accessing the URL associated with the user's account. The system may partition or organize users in a variety of ways, and may assign a mailbox to each user. The network will often incorporate a user authentication process, whereby the user will enter a user identifier and a password, or some other security combination. The processing involves the user requesting information stored as part of the user's account and then the user receiving the requested information, such as a message from another party, in any of a variety of formats.

Figure 3:
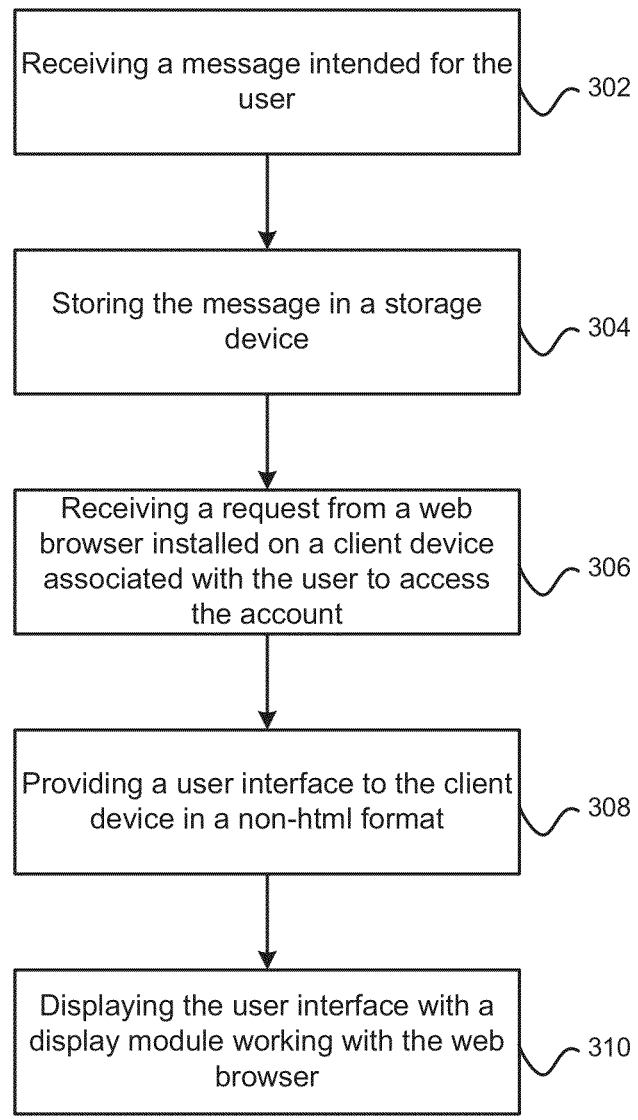
FIG. 3 is an example of a flow chart illustrating a method for accessing user messages.

FIG. 3 is an example of a flow chart illustrating a method for accessing user messages. The hosted communications provider 102 receives a communications message intended for the user, operation 302. The hosted communications provider 102 stores the communications message in a memory storage device 206, operation 304. The hosted communications provider 102 receives an access request to access the user account, operation 306. The access request is from the web browser module 208 installed on a client device associated with the user. The hosted communications provider 102 provides a user interface 212 to the client device, operation 308, wherein in one example the user interface 212 includes information associated with the user account. At least a portion of the user interface 212 is provided in a format which does not include HTML formatted code. The user's device, such as client computer 111, receives the user interface 212; and the web browser module 208 causes the user interface 212 information to display for the user.

A variety of examples are disclosed herein which provide for a messaging system, where a client device is configured to receive information for display in multiple formats, including HTML and non HTML. Where the client device is part of a hosted communication network, communications between the network and the client device are through an IP network, such as the Internet. The network receives messages and data information for the user and stores this information in a memory storage device accessible on request from the user. When the network receives an access request, the information is retrieved from the memory storage device and prepared for transmission to the client device. At least a portion of the information is prepared using a display format other than an HTML format. The information is received at the client device and displayed for the user on a display module that supports the display format.

Figure 4:
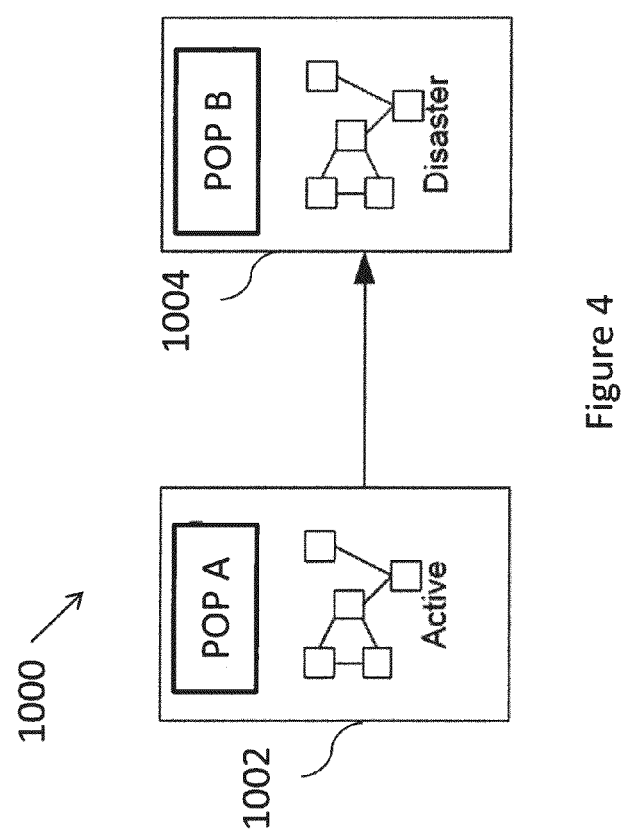
FIG. 4 is an example of a diagram of a portion of a hosted communication network.

FIG. 4 shows an example of a diagram of a portion of a hosted communication network 1000, such as network 102 of FIG. 1, where the network 1000 includes two Points of Presence (POP) units, 1002 and 1004. Each POP unit includes a server and configuration to process communications with the users supported therefrom. Each POP unit includes a configuration for routing calls to the user. The POP units are provided in pairs, where a first POP A 1002 is active and a second POP B 1004 is redundant and dynamic. During operation, the POP A 1002 handles all the call routing, and provides updates to call logs and user preferences to store in POP B 1004. As indicated, the flow of information is in one direction. As the active POP is the operational unit processing communications and updating call logs and other information which is stored in the database or memory storage unit. The stored information includes call history and other user specifics. The redundancy allows for system recovery and backup, however, such disaster recovery may take several hours to implement if there is an actual failure of the active POP A 1002.

Figure 5:
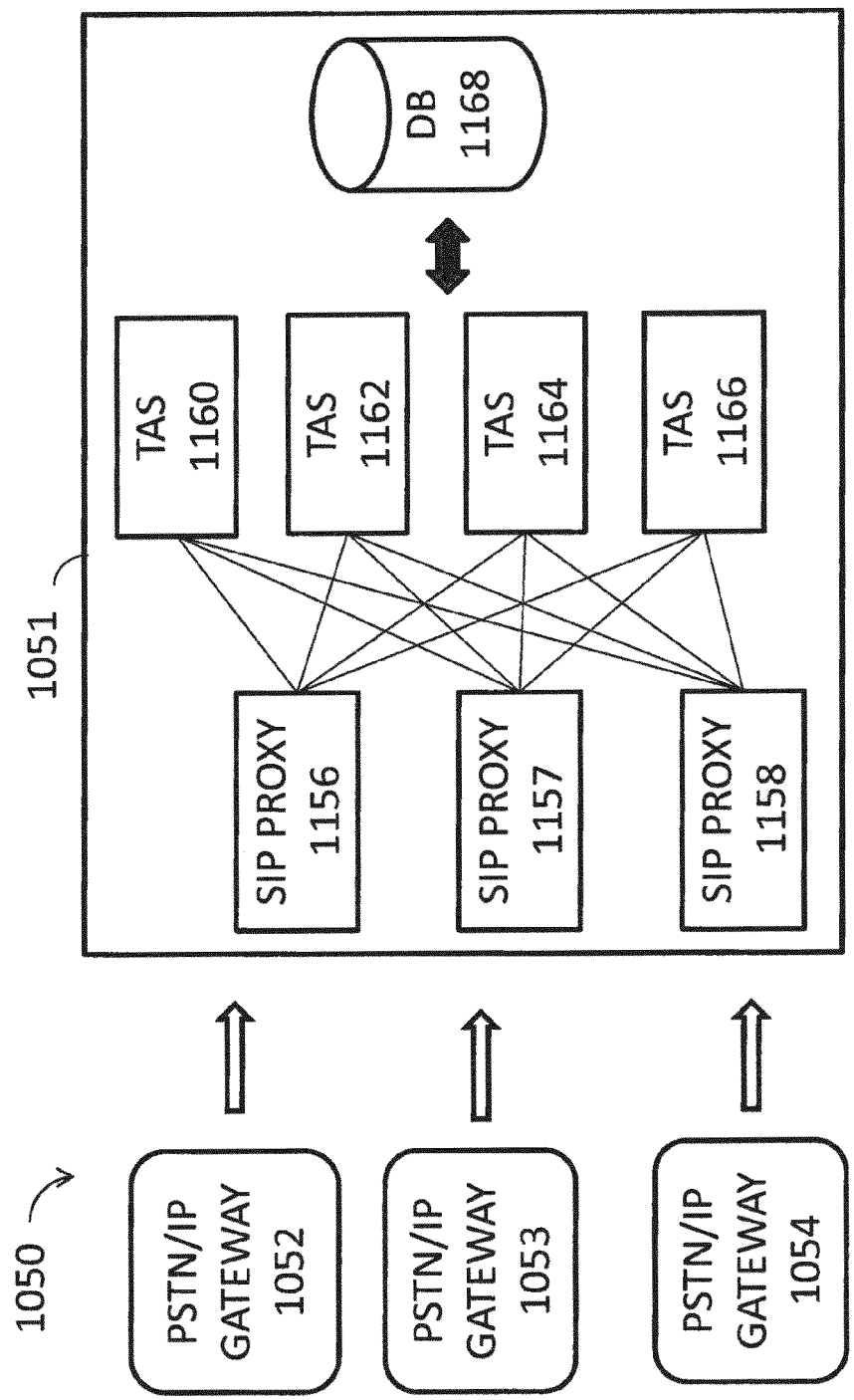
FIG. 5 shows an example of a system incorporating a network coupled to PSTN/IP gateways.

FIG. 5 illustrates an example of a system 1050 incorporating the network 1051, wherein the network 1051 is coupled to PSTN/IP gateways 1152, 1153, 1154. The system 1050 has two POPs and is split into active and disaster portion. The two portions are considers units, and are operated so as to duplicate copies or twins. Each POP has a twin, where one twin runs is an Active Mode, while the other twin may be in a Disaster Mode or Stand-by Mode. In some implementations, the network 1051 is configured to couple to multiple gateways, such as gateway 1154, wherein each gateway may couple to a different service provider or type of service. For communications with users supported by the network 1051, the gateway 1152 receives signals from circuit-switched networks and telecommunication networks, such as PSTN or a telephone company, and is also coupled to an IP network. The gateway 1152 provides an interface allowing VoIP calls to be routed from a hosted communication system to a traditional telephone network. The network 1051 includes multiple SIP proxy units 1156, 1157 and 1158, each of which routes calls to Telephone Application Server (TAS) units 1160, 1162, 1164 and 1166. Each SIP proxy unit balances traffic among the TAS units. The TAS units each receive information from the database (DB) 1168, which stores user information including preferences, call processing instructions, and other user-specific information. The TAS units are smart routers, which not only direct calls throughout the network 1051 but are also capable of applying rules and implementing call processing rules. For example, the TAS unit may retrieve information about a given user as to default device. Each TAS unit acts as a POP, where pairs of POPs provide for an active POP and a disaster POP as discussed hereinabove. The system 1050 provides a flexible, adaptive system for handing multiple users and interfacing with a variety of telecommunications companies and gateways. Performance and capacity of the system 1050, however, is limited by the database structure.

Figure 6:
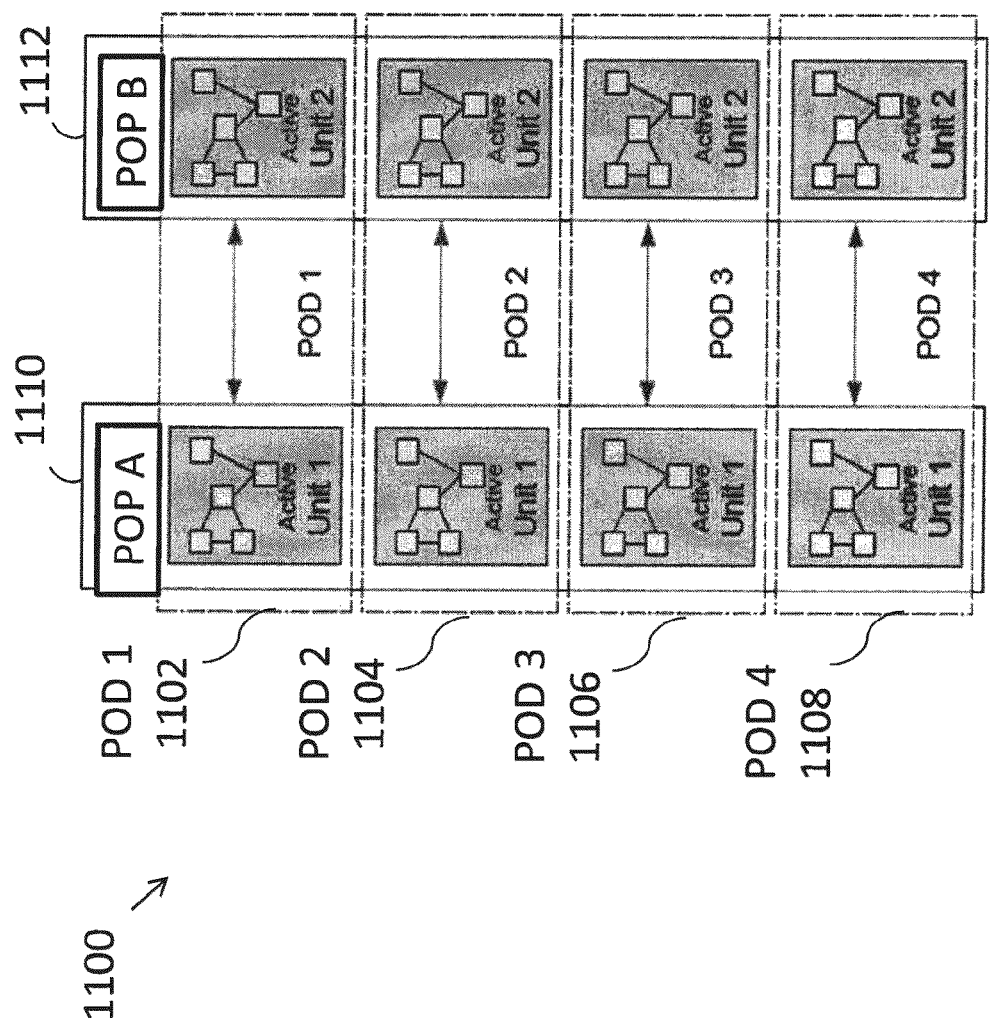
FIG. 6 shows such an example of a system that includes several pairs of Point-of Presence (POP) units.

To improve the performance of the hosted communication system, multiple active POPs can be provided. FIG. 6 illustrates an example of a system 1100 that includes several pairs of POPs that are both active units. Each pair of active POPs makes up a Part of Data (POD) module. POP A 1110 includes a unit 1 in each of PODs 2, 1104, 1106 and 1108; and POP B 1112 includes a unit 2 in each of PODs 1102, 1104, 1106 and 1108. In this way, the unit 1 and unit 2 create a pair. To identify a particular unit of a POD, each POP is referred to as a unit, wherein POP A of POD 1102 may be referred to as P1, U1; and POP B of POD 1102 may be referred to as P1, U2. The bi-directional arrow(s) between PODs indicates that both are active and operational, and the PODs share information during operation, such as call log updates.

Figure 7:
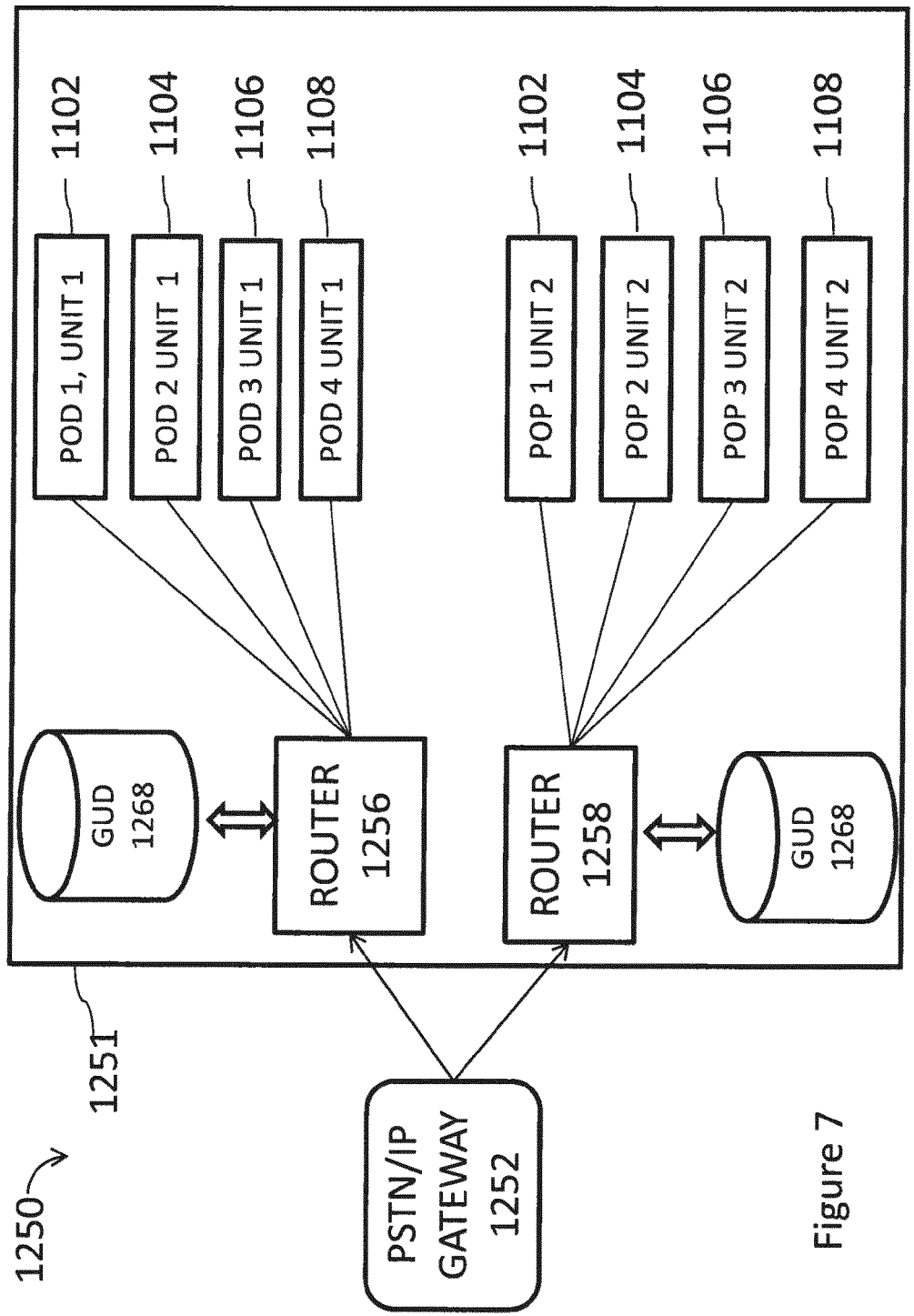
FIG. 7 shows an example of a network that includes routers and Session Initiation Protocol (SIP) proxy units with added functionality to identify a POD associated with a user to a communication.

The configuration of system 1000 may be used in a system 1250 illustrated in FIG. 7, which includes a hosted communication network 1251. Various sources may communicate with the network 1251 through gateways, such as PSTN/IP gateway 1252, which each may be coupled to a different telephone company or other communication source. The gateways provide the digitized signals to the network 1251. To process these digitized signals, the network 1251 includes routers 1256, 1258, which can be SIP proxy units with added functionality to identify the POD associated with a user to a communication. The routers 1256, 1258 are based on a SIP proxy unit for processing telecommunication signals, and is enhanced to provide routing capabilities based on user information stored in a Global User Data (GUD) 1145 data or memory storage unit. Unlike the use of the SIP proxy unit for traffic and load balancing, the enhanced routers 1256, 1258, identify the location of the network user to a communication and the associated POD unit. The routers 1256, 1258 obtain this information from the GUD 1268, 1269, respectfully, which each stores information mapping each user telephone number to the POD supporting the user.

In some implementations, when a call is received at the routers 1256, 1258, the routers 1256, 1258, the GUDs 1268, 1269 information is used to identify the POD to which the calls are to be routed to reach the user. The GUDs 1268, 1269 may be any of a variety of memory storage devices. In some implementations, the GUDs 1268, 1269 may include additional information relating to a user. The configuration allows for double or twin active routing paths, where both routers 1256, 1258 are active. In this way, if either of routers 1256, 1258 has an operational problem, or it is desired or needed to stop operation for any period of time or to replace hardware, the other active router is available so that any impact on user experience may be minimized.

In some implementations, any number of duplicated router devices for various other configurations can be implemented. Also, in some implementations, other network components can be added between the gateway 1252 and the routers 1256, 1258 in other implementations. Each of the routers 1256, 1258 may be located in different geographical locations or may be co-located in one place. The routers 1256, 1258 may be individual servers or may be partitions of a same server. Similarly, each of routers 1256, 1258 may be configured using multiple servers, such as in a server bank. In some implementations, each router may be an individual server.

Figure 8:
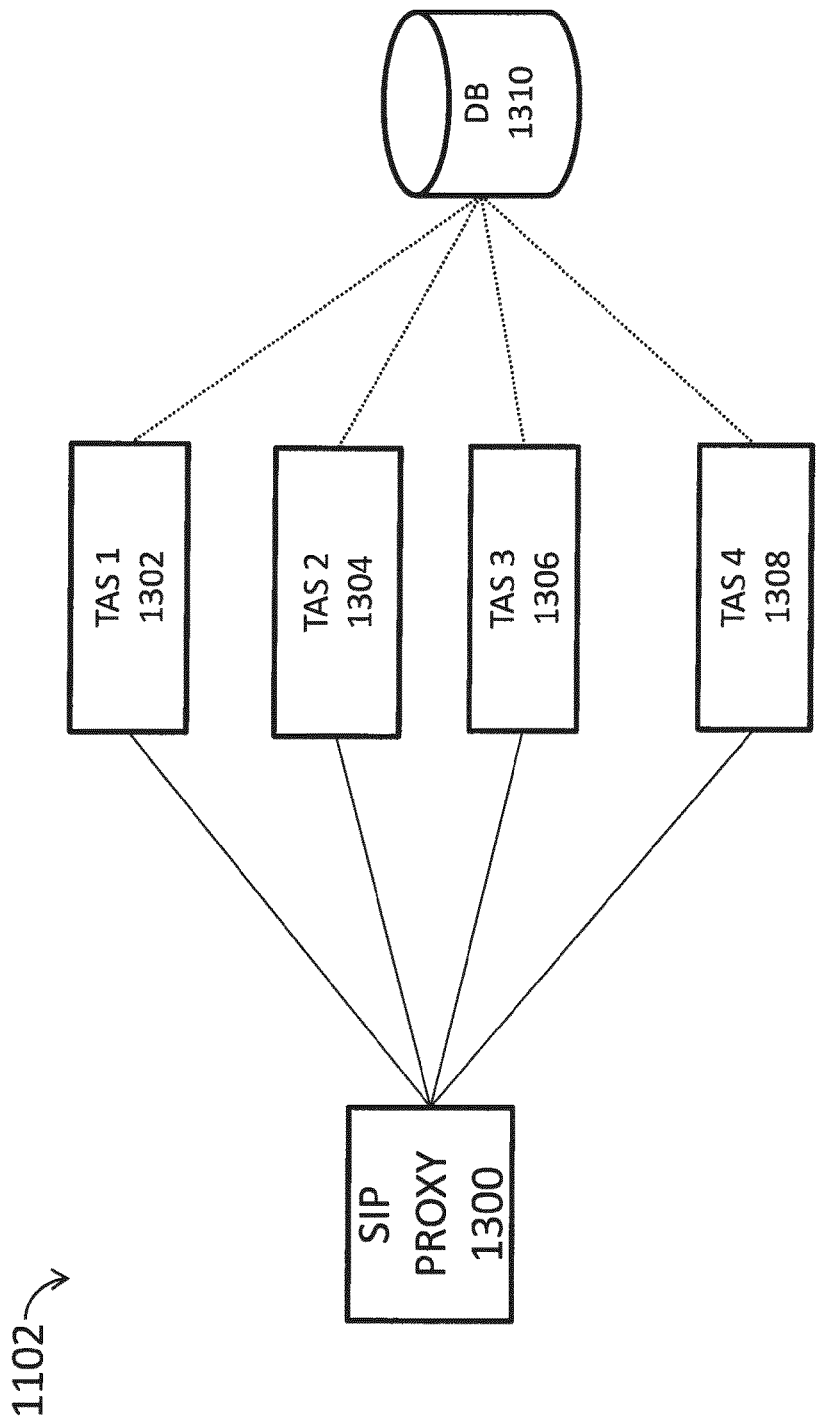
FIG. 8 shows an example of a Part of Data (POD) module.

FIG. 8 illustrates an example of a POD module, such as POD 1102 of FIG. 6. The routers 1256, 1258 include a SIP proxy module 1300, which is configured to support the SIP protocol for telecommunication, and Traffic Application Servers (TASs) 1302, 1304, 1306, 1308, which are used to interface with user devices (not shown). The TAS is a server having computing capabilities and interfaces with a database (DB) 1310. The DB 1310 stores user-specific information used in operation of the network and user device. The user-specific information may be in the form of data formatted for use by the TAS and user device. The user-specific information may be in the form of computer-readable instructions used by or in coordination with the TAS to service the user device. The user-specific information may indicate an order of user devices to contact for an in-coming call, such as to first route a call or transmission to a desk phone and then to a cell phone. The user may specify the user-specific information, such as during system set-up or on the fly. The user-specific information may be set by a network administrator, set by default, or set by the user. The user-specific information may store personal preferences, ringtones, messages, responses, on-hold instructions, and any of a variety of options available in the network. By routing the call to the POD supporting a specific user, the POD then contains sufficient information to process the communication to that specific user. The DB may be updated and the information made available to each TAS within a POD.

While FIG. 8 shows a portion of the POD 1102 that includes unit 1, in some implementations, the unit 2 of POD 1102 can be a duplicate of unit 1. In some implementations, any number of TAS units also can be implemented. The SIP proxy module 1300 operates to balance traffic and is in the network. The SIP proxy module 1300 has access to the status of each TAS and therefore assigns a TAS to a communication based on the status information. Such implementations may process communications in a variety of ways. When a communication, including voice calls and messages, are received at the routers the network may provide various routing schemes.

Figure 9:
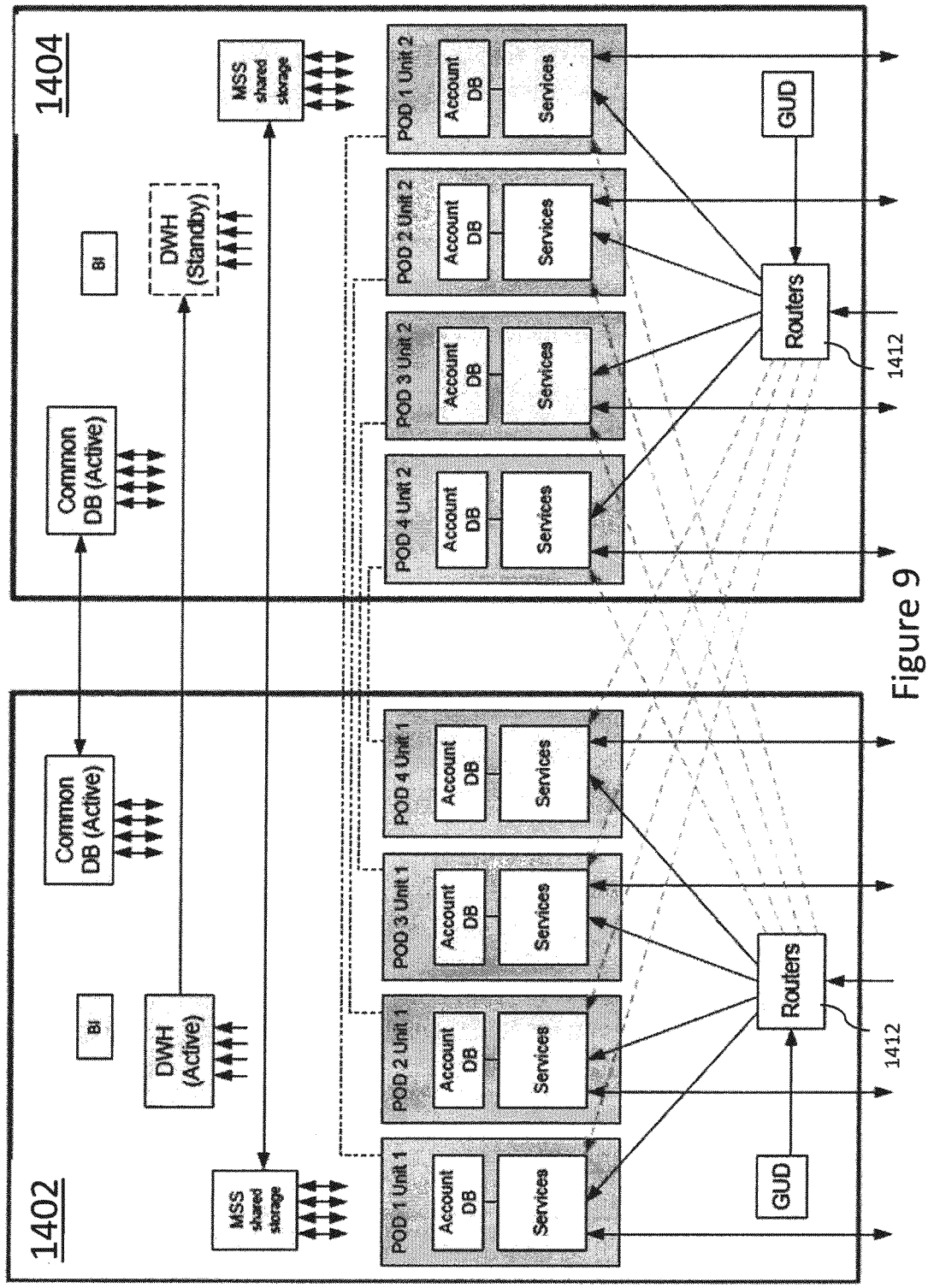
FIG. 9 shows an example of two POD modules with respective routers receiving a communication and process the communication by two paths involving multiple POPs.

FIG. 9 shows an example of two POPs having a respective router 1412/1414, where routers 1412, 1414 receive a communication and process the communication by two paths involving multiple POPs. Calls are handled by a given POD, such as POD 1, which has a portion in multiple POPS (e.g., POP 1 1402 and POP 2 1404). The portion of POD 1 in POP 1 1402 is unit 1, and the portion of POD 1 in POP 2 1404 is unit 2. Data and update information is stored in both POP 1 1402 and POP 2 1404. The routers 1412, 1414 are each coupled to individual GUDs storing the same mapping information, which maps an user identifier to a user device. The routers 1412, 1414 support the SIP proxy protocols, while using the mapping information from the GUD to route calls. The routers 1412, 1414 are each coupled to multiple TAS modules for processing communications. Each TAS module is coupled to a data base storing user-specific information.

Figure 10:
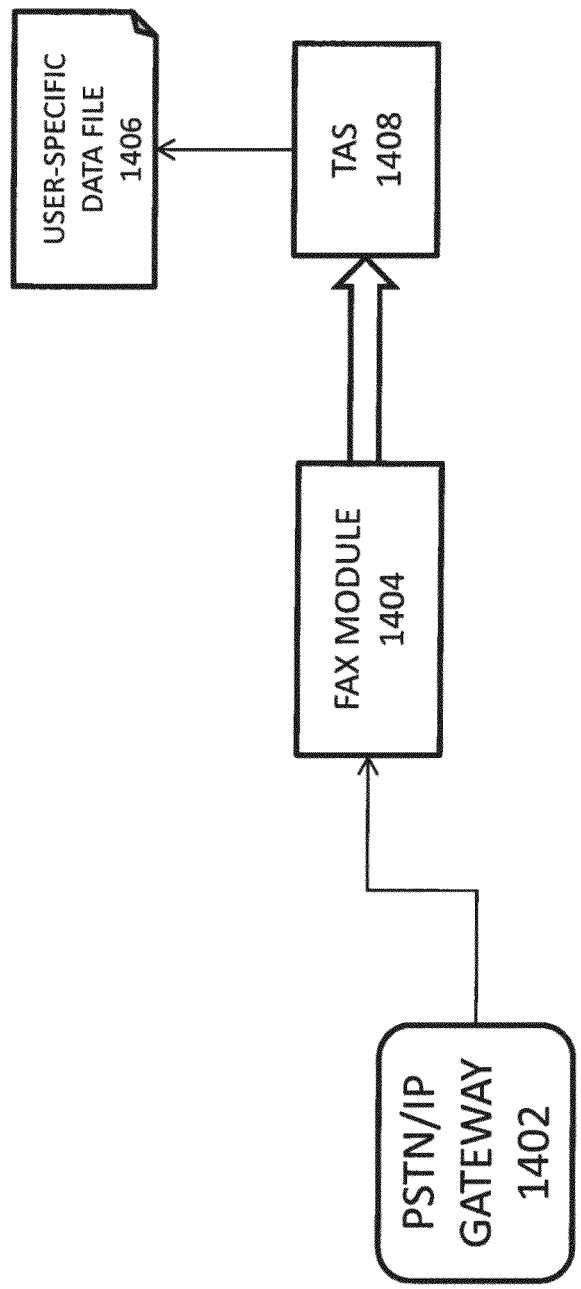
FIG. 10 shows an example of a PSTN/IP gateway coupled to a fax module.

FIG. 10 shows an example of a PSTN/IP gateway 1402 coupled to a fax module 1404. As shown in FIG. 10, the PSTN/IP gateway 1402 can generate and transmit fax information to the fax module 1404. The fax information is received from the gateway 1402 at the fax module 1404 (which also can be configured to receive data in other formats in addition to fax data). The fax module 1404 forwards a notification to the user device through the TAS 1408 serving the user device. In some implementations, the fax module 1404 receives the data, converts the data into a designated format, and stores the formatted data for retrieval by the user of the user device. In some implementations, the formatted data can be stored in user data file 1406, which is accessible from one or more access media, such as email, mobile device interface, and the like. In some implementations, the data file 1406 is updated at both active POPs in a pair. In some implementations, the data file 1406 stored is stored at only one POP. In some implementations, the data file 1406 is stored in a central location accessible by users from various devices.

As presented herein, a hosted network expands coverage while guarding against server failures by providing duplicate POPs, which defines a POD as having one unit in each POP. Such application enables a SIP proxy router in each POP to access GUD information so as to route calls appropriately. The duplication allows either POP to operate independently in case of a failure of the other unit.

Although the present invention has been described in detail with reference to particular embodiments, persons possessing ordinary skill in the art to which this invention pertains will appreciate that various modifications and enhancements may be made.

Generic Computing System

Figure 11:
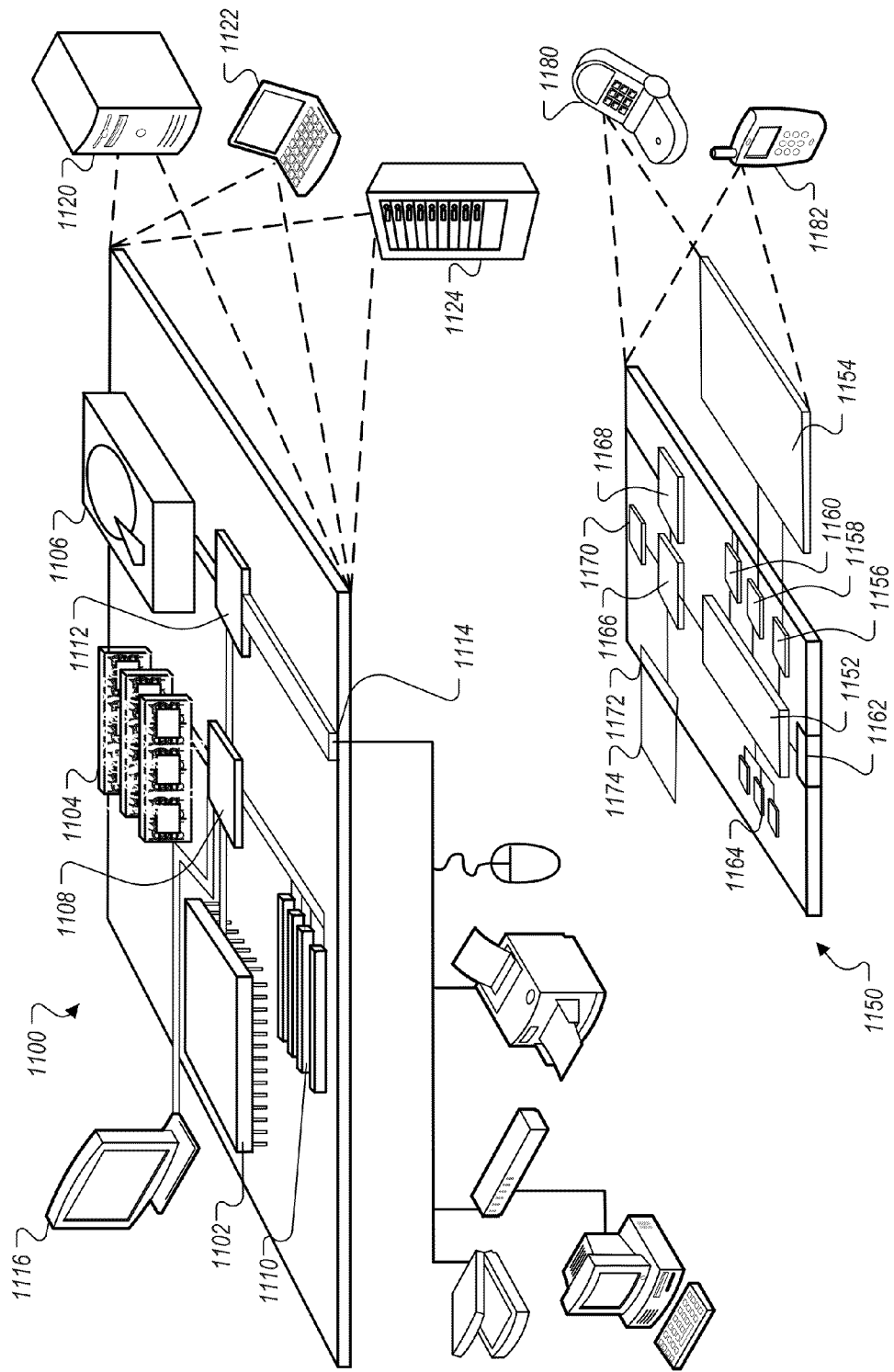
FIG. 11 is an example of a block diagram of a generic processing device that may be used to execute methods and processes disclosed herein.

FIG. 11 is a block diagram of computing devices 1100, 1150 that may be used to implement the systems and methods described in this document, as either a client or as a server or plurality of servers. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a computer-readable medium. In one implementation, the memory 1104 is a volatile memory unit or units. In another implementation, the memory 1104 is a non-volatile memory unit or units.

The storage device 1106 is capable of providing mass storage for the computing device 1100. In one implementation, the storage device 1106 is a computer-readable medium. In various different implementations, the storage device 1106 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of duties is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can process instructions for execution within the computing device 1150, including instructions stored in the memory 1164. The processor may also include separate analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD display or an OLED display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication (e.g., via a docking procedure) or for wireless communication (e.g., via Bluetooth or other such technologies).

The memory 1164 stores information within the computing device 1150. In one implementation, the memory 1164 is a computer-readable medium. In one implementation, the memory 1164 is a volatile memory unit or units. In another implementation, the memory 1164 is a non-volatile memory unit or units. Expansion memory 1174 may also be provided and connected to device 1150 through expansion interface 1172, which may include, for example, a SIMM card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS receiver module 1170 may provide additional wireless data to device 1150, which may be used as appropriate by applications running on device 1150.

Device 1150 may also communication audibly using audio codec 1160, which may receive spoken information from a user and convert it to usable digital information. Audio codex 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product (e.g., non-transitory), apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method comprising:
   receiving a voice mail message intended for a user having an account with a virtual private branch exchange (vPBX) communications provider;
   associating the voice mail message with the account and storing the voice mail message in a storage device;
   providing a user interface for presentation in a web browser executing on a client device, the user interface comprising a first portion that is in a first file format that is compatible with the web browser and a second portion that is in a second, different file format that is compatible with a display module installed on the client device, wherein the second, different file format is a proprietary format developed by the vPBX communications provider, and wherein the display module is a proprietary module developed by the vPBX communications provider, that is compatible with the proprietary format;
   receiving, from the display module and through the second portion of the user interface being presented in the web browser, a request to access the user account;
   providing, to the display module,
   information associated with the user account and data identifying the voice mail message;

receiving, from the display module and through the second portion of the user interface being presented in the web browser, a request to play back the voice mail message; and providing the voice mail message to the display module for playback on the client device.

2. The method of claim 1, wherein the second file format is for use by the display module working with the web browser installed on the client device.

3. The method of claim 1, wherein the display module is a plug-in to the web browser.

4. The method of claim 1, wherein the information associated with the user account includes one or more links to messages associated with the account in the storage device.

5. A system comprising:
   a memory storage device, the memory storage device storing one or more messages associated with a user account of a virtual private branch exchange (vPBX) communication provider, the one or more messages comprising a voice mail message; and
   one or more computers configured to perform operations comprising:
   providing a user interface for presentation in a web browser executing on a client device, the user interface comprising a first portion that is in a first file format that is compatible with the web browser and a second portion that is in a second, different file format that is compatible with a display module installed on the client device, wherein the second, different file format is a proprietary format developed by the vPBX communications provider, and wherein the display module is a proprietary module developed by the vPBX communications provider that is compatible with the proprietary format;
   receiving, from the display module and through the second portion of the user interface being presented in the web browser, a request from a web browser executing on a client device to access the user account;
   providing, to the display module, information associated with the user account and data identifying the voice mail message;
   receiving, from the display module and through the second portion of the user interface being presented in the web browser, a request from the client device to play back the voice mail message; and
   providing the voice mail message to the display module for playback on the client device.

6. The system of claim 5, the operations further comprising retrieving the voice mail message from the memory storage device in response to the request to play back the voice mail message.

7. The system of claim 5, further comprising an account database.

8. The system of claim 7, wherein the account database stores information specific to the user account, and the information is configured to authorize the request to access the user account.

9. The system of claim 8, wherein the voice mail message is received from a second user.

10. The system of claim 5, wherein the one or more messages include a Short Message Service (SMS) message.

* * * * *

UNITED STATES PATENT AND TRADEMARK OFFICE
CERTIFICATE OF CORRECTION

| | | |
|---|---|---|
| PATENT NO. | : 8,909,695 B1 | Page 1 of 1 |
| APPLICATION NO. | : 13/084519 | |
| DATED | : December 9, 2014 | |
| INVENTOR(S) | : Vlad Vendrow and Vladimir Shmunis | |

It is certified that error appears in the above-identified patent and that said Letters Patent is hereby corrected as shown below:

In the Claims,

Column 16, lines 60-61, in Claim 1: Please delete "provider," and insert --provider--; and Column 18, lines 5-6, in Claim 5: After "request" delete "from a web browser executing on a client device".

Signed and Sealed this
Twelfth Day of May, 2015

Michelle K. Lee
*Director of the United States Patent and Trademark Office*